United States Patent [19]

Dobashi

[11] 4,275,954
[45] Jun. 30, 1981

[54] AUTOMATIC FOCUSING APPARATUS FOR CAMERA

[75] Inventor: Toshio Dobashi, Kawasaki, Japan
[73] Assignee: Nippon Kogaku K.K., Tokyo, Japan
[21] Appl. No.: 64,717
[22] Filed: Aug. 8, 1979

[30] Foreign Application Priority Data

Aug. 17, 1978 [JP] Japan ............................ 53-111965[U]

[51] Int. Cl.³ ............................ G03B 3/00; G03B 7/08
[52] U.S. Cl. ........................................ 354/198; 354/25
[58] Field of Search .......................... 354/25, 195-201; 352/140

[56] References Cited

U.S. PATENT DOCUMENTS

| | | | |
|---|---|---|---|
| 4,093,365 | 6/1978 | Isono | 354/25 X |
| 4,110,769 | 8/1978 | Schutz et al. | 354/195 |
| 4,153,903 | 3/1979 | Pizzuti et al. | 354/195 |

FOREIGN PATENT DOCUMENTS 53-44021  4/1978  Japan .................................... 354/25

Primary Examiner—L. T. Hix
Assistant Examiner—Thomas H. Tarcza
Attorney, Agent, or Firm—Shapiro & Shapiro

[57] ABSTRACT

An automatic focusing apparatus in a camera is provided in which a winding operation for advancing the film and for charging the shutter does not cause the displacement of a manual focusing member but returns an automatic focusing member only to a charge position, significantly simplifying the operations in manually focused photography as well as in automatically focused photography.

9 Claims, 6 Drawing Figures

AUTOMATIC FOCUSING APPARATUS FOR CAMERA

BACKGROUND OF THE INVENTION

1. Field of the Invention

The present invention relates to an automatically or manually focusable camera, and more particularly to a camera in which an automatic focusing member is blocked in case of manually focused photography.

2. Description of the Prior Art

An apparatus of this kind is already disclosed in the Japanese Patent Laid-Open No. 44021/1978 entitled "Safety device for automatic focusing apparatus". In such apparatus, automatically focused photography can be conducted by manually operating a charging member thereby places an automatic focusing member for driving the photographing lens at a charge position, and also places a manual focusing member at an automatic focusing position. When the shutter is released in this state, the manual focusing member is blocked while the automatic focusing member is put into operation. On the other hand, manually focused photography at a focus distance suitably selected by the manual focusing member can be conducted by similarly operating said charging member, blocking said automatic focusing member at the charge position but displacing the manual focusing member from the automatic focusing position to a desired distance within the range from infinity to the shortest focusing distance of the lens, and releasing the shutter in this state.

However, as a camera generally requires a winding operation for advancing the photographic film and charging the shutter, there will be required, in a camera equipped with an apparatus as explained in the foregoing, a winding operation in addition to the manipulation of the charging member for the automatic focusing apparatus. This renders the automatic focusing operation rather cumbersome.

On the other hand, if the charging member is linked with the winding operation for advancing the film and charging the shutter in order to overcome the above-mentioned drawback, the charging member is actuated with every winding operation, causing the manual focusing member to be returned to the automatic focusing position every time. Thus, in case of manually focused photography, manipulation of the manual focusing member after each winding operation will be required, thus rendering the manual focusing operation cumbersome.

SUMMARY OF THE INVENTION

Thus, an object of the present invention is to provide an automatic focusing apparatus for a camera wherein the winding operation for advancing the film and for charging the shutter does not cause the displacement of the manual focusing member but returns only the automatic focusing member to the charge position, thereby overcoming the above-mentioned drawbacks.

BRIEF DESCRIPTION OF THE DRAWINGS

FIGS. 1 to 4 show a first embodiment of the present invention, wherein FIG. 1 is a cross-sectional view of the apparatus of the present invention and showing manually focused photographing;

FIG. 2 is a cross-sectional view along the line A—A in FIG. 1 and showing a state before the start of shutter release;

FIG. 4 is a developed external view of the manual focusing member; and

DESCRIPTION OF THE PREFERRED EMBODIMENTS

Now the present invention will be explained in detail by the following explanation to be taken in conjunction with the attached drawings.

Figure 1:
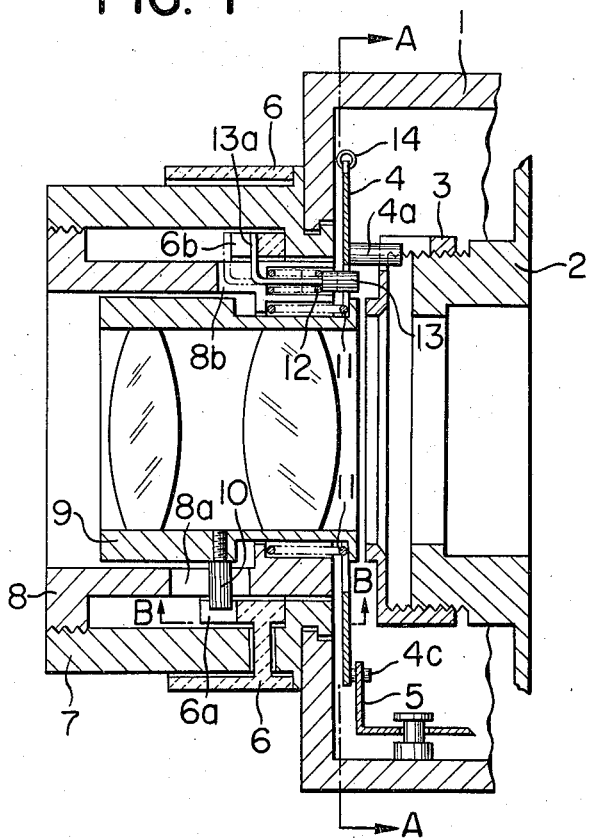
Figure 2:
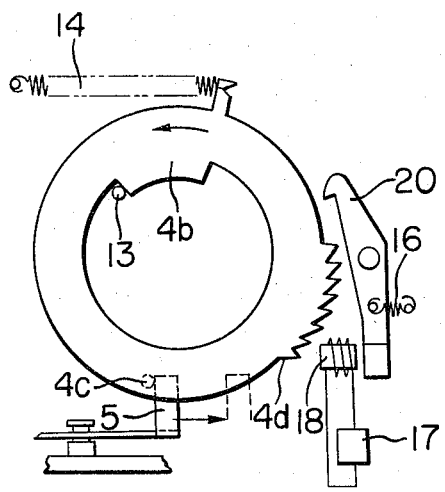

In FIGS. 1 to 4 showing an embodiment of the present invention, the camera body 1 is provided with a fixed member 2 on which there is screw fitted a rotary member 3 so as to be axially displaceable by the rotation thereof. There is provided an actuating member 4 having pins 4a, 4c, (FIG. 1) a projecting portion 4b and teeth 4d (FIG. 2). Pin 4a is fitted into a groove provided in said rotary member 3 so as to cause integral rotation of the actuating member 4 and the rotary member 3. Projection portion 4b is adapted to engage a pin 13 brought into a protruding position in the manually focused photography mode of operation, to be explained later. Pin 4c is adapted to engage a release link member 5, to be explained later, to block the rotation of the actuating member 4. The automatic focusing members are composed of said rotary member 3 and the actuating member 4.

The release link member 5, performing a forward movement in connection with the shutter release operation and a reverse movement in connection with the winding operation, is structured to displace to the right in FIG. 2 by a predetermined stroke (to the phantom line position) in response to the shutter release operation. Member 5 disengages from the pin 4c at the start of said displacement and also releases a leading shutter curtain (not illustrated) upon completion of said displacement.

Figures 3A, 3B:
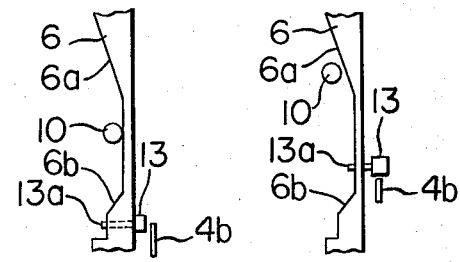
FIGS. 3A and 3B are developed cross-sectional views along the line B—B in FIG. 1, and showing the positional relationship of the cam face respectively in the automatic focusing and in the manual focusing.
Figure 4:
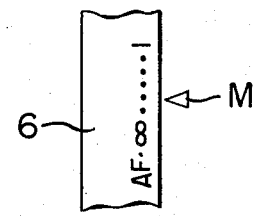

A manual focusing member 6 comprises in the present embodiment, a focusing ring having thereon a distance scale (FIG. 4), and is provided, as shown in FIGS. 3A and 3B, with a cam face 6a. Cam face 6a is maintained in contact with a pin 10, which is fixed to a lens support tube 9, by a spring 11 (FIG. 1). Cam face 6a and pin 10 cooperate to displace the lens support tube 9 along the optical axis of the lens in response to the rotation of said manual focusing member 6. The camera body 1 is further provided with a fixed outer tube 7 and an inner tube 8 screw fitted therewith, said outer tube 7 being provided with a fixed index mark M as shown in FIG. 4. The fixed pin 10 is fitted into an axially elongated groove 8a provided in said inner tube 8 and displaces therealong when said lens support tube 9 is axially displaced.

The spring 11 is provided between said inner tube 8 and the lens support tube 9 to constantly bias said tube 9 towards the camera body 1.

Also provided is a spring 12 between an L-shaped pin 13 and the inner tube 8 to constantly bias said pin 13 towards the camera body 1, thereby maintaining the rising or leg portion 13a of said pin 13 in contact with a cam face 6b. Said pin 13 is fitted into an axially extended groove 8b of the inner tube 8 and displaces therealong and also along said cam face 6b in response to the rotation of manual focusing member 6.

Actuating member 4 is constantly biased counterclockwise by a spring 14 as represented in FIg. 2. The pin 13 engages the projecting portion 4b of the actuating member 4 when the cam face 6b is positioned with respect to the rising portion 13a of the pin 13 as shown in FIG. 3B. However, when the manual focusing member is rotated to a position as shown in FIG. 3A, pin 13 is moved by cam face 6b to a position where it cannot engage the actuating member. A latch 20 rotatably supported and constantly biased counterclockwise by a spring 16 is maintained in engagement with the teeth 4d of the actuating member 4, said engagement being controlled by a magnet 18 of the automatic focusing unit 17, as will be described.

The function of the apparatus of the present invention will now be explained in the following.

(i) Manually focused photography

At first, the manual focusing member 6 is rotated so as to match a desired distance on the distance scale ($\infty \sim 1$) on the manual focusing member 6 with the fixed index mark M on the outer tube 7 as shown in FIG. 4. In this state, wherein the distance scale is positioned in front of the index mark M, the pin 13 is positioned with respect to the manual focusing member 6 as shown in FIG. 3B and thus protrudes towards the camera body 1 due to the biasing force of the spring 12. In this position, it engages the projecting portion 4b and blocks the movement of the actuating member 4. In this manner the automatic focusing members 3, 4 are blocked in this state. When the shutter is released by a shutter release button (not shown), the release link member 5 performs a displacement to the right (FIG. 2) by a predetermined stroke to release, at the end of said stroke indicated by phantom lines, a leading shutter curtain (not illustrated) to effect an exposure.

Upon performing a subsequent winding operation, the release link member 5 returns to the full-lined original position shown in FIG. 2 to restore the mechanism to its original state before photographing, illustrated in FIG. 2. During these operation the automatic focusing members 3, 4 remain blocked by the pin 13 and the manual focusing member remains in its previously fixed position.

(ii) Automatically focused photography

In this mode the manual focusing member 6 is rotated from the manual focusing position shown in FIG. 3B so as to match the automatic focusing position indicated by a mark AF (FIG. 4) on the focusing member with the aforementioned fixed index mark M. This displaces pin 10 to a position shown in FIG. 3A, and simultaneously moves the lens support tube 9 to the right-most position shown in FIG. 1, focused at an infinite distance. At the same time the pin 13 is displaced from the position shown in FIG. 3B to that shown in FIG. 3A, it is retracted from the orbit of the actuating member 4, thus releasing the automatic focusing members 3, 4. However, the actuating member 4 does not rotate in this state because of the engagement between the pin 4c and the release link member 5. When the shutter is released in this state, the release link member 5 performs a rightward displacement as before to the predetermined stroke position indicated by the phantom lines in FIG. 2. Pin 4c is released at the start of said displacement, allowing the actuating member 4 to rotate counterclockwise due to the biasing force of the spring 14.

Thereupon the rotary member 3, rotating integrally with the actuating member 4, moves to the left in FIG. 1 to displace the lens support tube 9 in the same direction against the biasing force of the spring 11.

Upon detection of the arrival of the lens support tube 9 at a proper focusing position by means of a known mechanism, the automatic focusing control unit 17 deactivates the magnet 18, previously energized, allowing the latch 20 to rotate counterclockwise under the biasing force of the spring 16 to engage the teeth 4d to block further rotation of the actuating member 4. In this manner the leftward displacement of the lens support tube 9 is terminated and automatic focusing is achieved. Upon completion of the subsequent displacement of the release link member 5 to the right (to the position of the phantom lines in FIG. 2), the leading shutter curtain is released in the same manner as explained already in connection with the manually focused photographing.

In response to the winding operation after photographing, the release link member 5 performs a return displacement (to the solid position) rotate the actuating member 4 clockwise, by virtue of its engagement with the pin 4c, against the biasing force of the spring 14, thereby restoring the mechanism to its state before photographing shown in FIG. 2.

Thus, in the foregoing first embodiment, the automatic focusing member returns to its original position by the winding operation in case of the automatically focused photography, i.e. when the index AF is matched with the fixed index mark M, so that there will not be required separate manipulation of the automatic focusing members.

Figure 5:
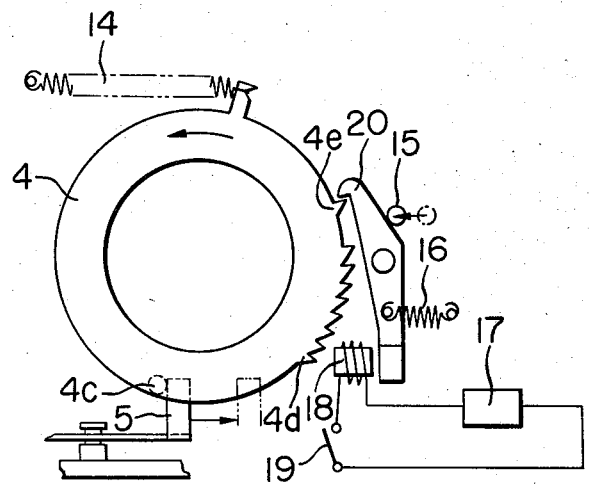
FIG. 5 is a view similar to FIG. 2 and showing second and third embodiments of the present invention.

FIG. 5 shows second and third embodiments of the present invention. In said second embodiment the mechanical engagement between the projecting portion 4b and the pin 13 is eliminated. Instead, in the manually focused photography mode wherein the distance scale ($1 \sim \infty$) on the manual focusing member 6 is matched with the fixed index mark M, a switch 19 connected between the magnet 18 and the automatic focusing control unit 17 is opened in cooperation with the movement of said manual focusing member 6 to deactivate the magnet 18, thereby allowing engagement between the latch 20 and a tooth 4e on actuating member 4 due to the biasing force of the spring 16. This blocks the actuating member 4 or the automatic focusing members 3, 4. In automatically focused photography, wherein the index AF is matched with the fixed index mark M, said switch 19 is closed in cooperation with the movement of the manual focusing member 6 to energize the magnet 18 thereby releasing the latch 20 from its engagement with actuating member 4. The shutter releasing operation and the winding operation are conducted in the same manner as in the foregoing first embodiment.

In the third embodiment, the switch 19 in the foregoing second embodiment is replaced by a pin 15 which is laterally displaced in cooperation with the movement of the manual focusing member 6 whereby, in case of manually focused photography with the distance scale $1 \sim \infty$ of the manual focusing member being matched with the fixed index mark M, the latch 20 is caused to engage with tooth 4e by the displacement of said pin 15 toward said latch 20 from the broken-lined position to the full-lined position in FIG. 5. This blocks the movement of the automatic focusing members 3, 4, when the shutter is released. In automatically focused photography said pin 15 is retracted in cooperation with the movement of the manual focusing member 6 to release the member 4. Other functions are conducted in the same manner as in the foregoing first embodiment.

As explained in the foregoing, the present invention, in which the winding operation does not cause the displacement of the manual focusing member but returns the automatic focusing member only to the charge position, significantly simplifies the operations in manually focused photography, as well as in the automatically focused photography.

I claim:

1. An automatic focusing apparatus for use in a camera for focusing a photographic lens by axial displacement thereof along the optical axis of the lens, the camera having winding means for winding film and for charging a shutter, and shutter release means for releasing the shutter to effect an exposure, comprising:

a manual focusing member movable within a predetermined range from a predetermined position;

means for coupling the manual focusing member to the lens and for displacing the lens along the optical axis for focusing in accordance with the movement of the manual focusing member within said predetermined range;

automatic focusing means including an automatic focusing member coupled to the lens, the automatic focusing member having a charge position and being displaceable from the charge position in response to the operation of the shutter release means for displacing the lens along the optical axis for focusing in accordance with the displacement of the automatic focusing member;

blocking means for blocking movement of the automatic focusing member from the charge position except when the manual focusing member is in said predetermined position; and means responsive to the operation of the winding means for moving the automatic focusing member from a displaced position to the charge position, said winding means being ineffective to vary the position of the manual focusing member.

2. An apparatus according to claim 1, wherein said manual focusing member includes signalling means, and said blocking means operates to block said automatic focusing member in response to said signalling means.

3. An apparatus according to claim 2, wherein said blocking means includes a member capable of engaging said automatic focusing member and blocking displacement of said automatic focusing member upon said engaging.

4. An apparatus according to claim 2, wherein said signalling means includes cam means capable of engaging said blocking means.

5. An apparatus according to claim 1, wherein the blocking means includes a blocking member having a portion engageable with cam means on the manual focusing member and means for biasing the blocking member into engagement with the cam means, the cam means being operative to position the blocking member to engage the automatic focusing member when the manual focusing member is positioned within said predetermined range.

6. An apparatus according to claim 5, wherein the automatic focusing member comprises a ring member having an internal projecting portion located to engage the blocking member.

7. An apparatus according to claim 1 further comprising a movable lens support which supports the photographic lens, and wherein the manual focusing member is rotatable with respect to the optical axis and the means for coupling comprises cam means on the rotatable member and pin means on the movable lens support, engagement between the cam means and the pin means being effective to axially displace the lens support in accordance with the rotation of the rotatable member.

8. An apparatus according to claim 1, wherein the automatic focusing means includes detecting means for detecting proper focus of the photographic lens, and stop means operative in response to said detecting for stopping the displacement of the automatic focusing member.

9. An apparatus according to claim 1, wherein the means responsive to the operation of the winding means for moving the automatic focusing member from a displaced position to the charge position comprises a link member, the link member being movable in a first direction from a predetermined position in response to the operation of the shutter release means and being movable in the reverse direction to said predetermined position in response to the operation of the winding means, the link member being engageable with the automatic focusing member when in the predetermined position to hold the automatic focusing member in said charge position.

* * * * *